Aug. 30, 1932.     F. W. OLIN ET AL     1,875,120
METHOD AND APPARATUS FOR INSPECTING CARTRIDGE SHELLS
Filed March 9, 1928     3 Sheets-Sheet 3
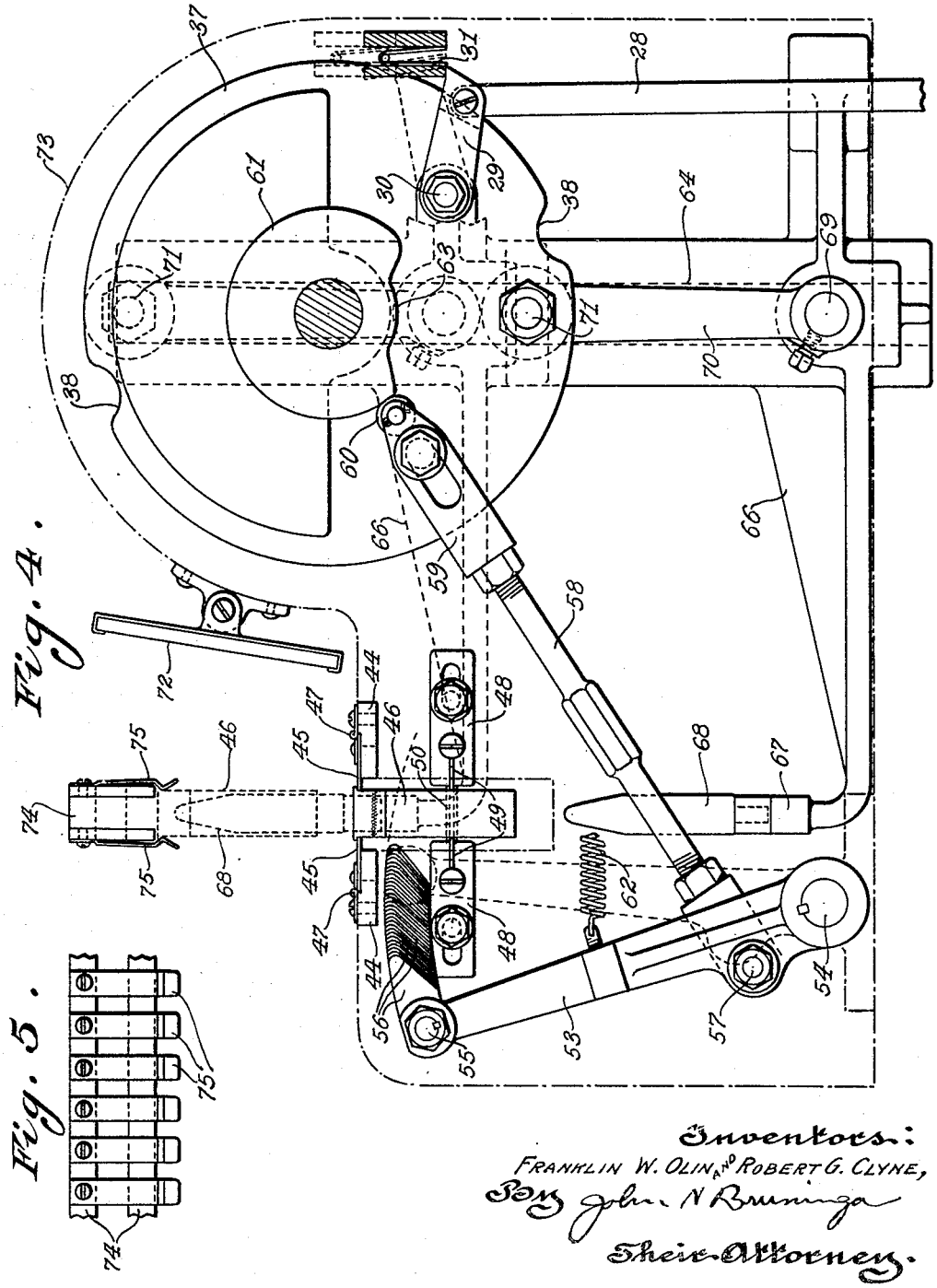
Inventors:
Franklin W. Olin, and Robert G. Clyne,
By John N Bruninga
Their Attorney.

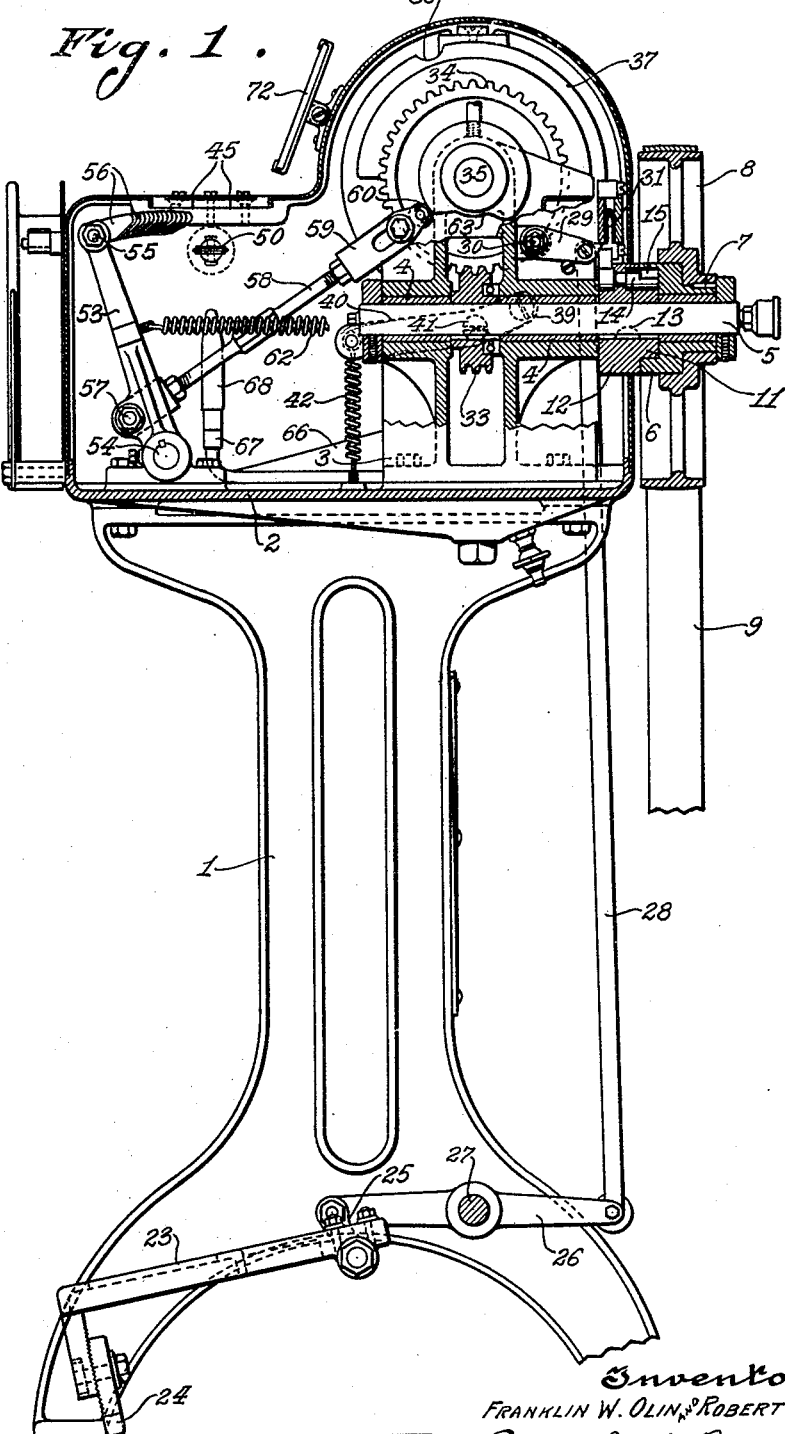

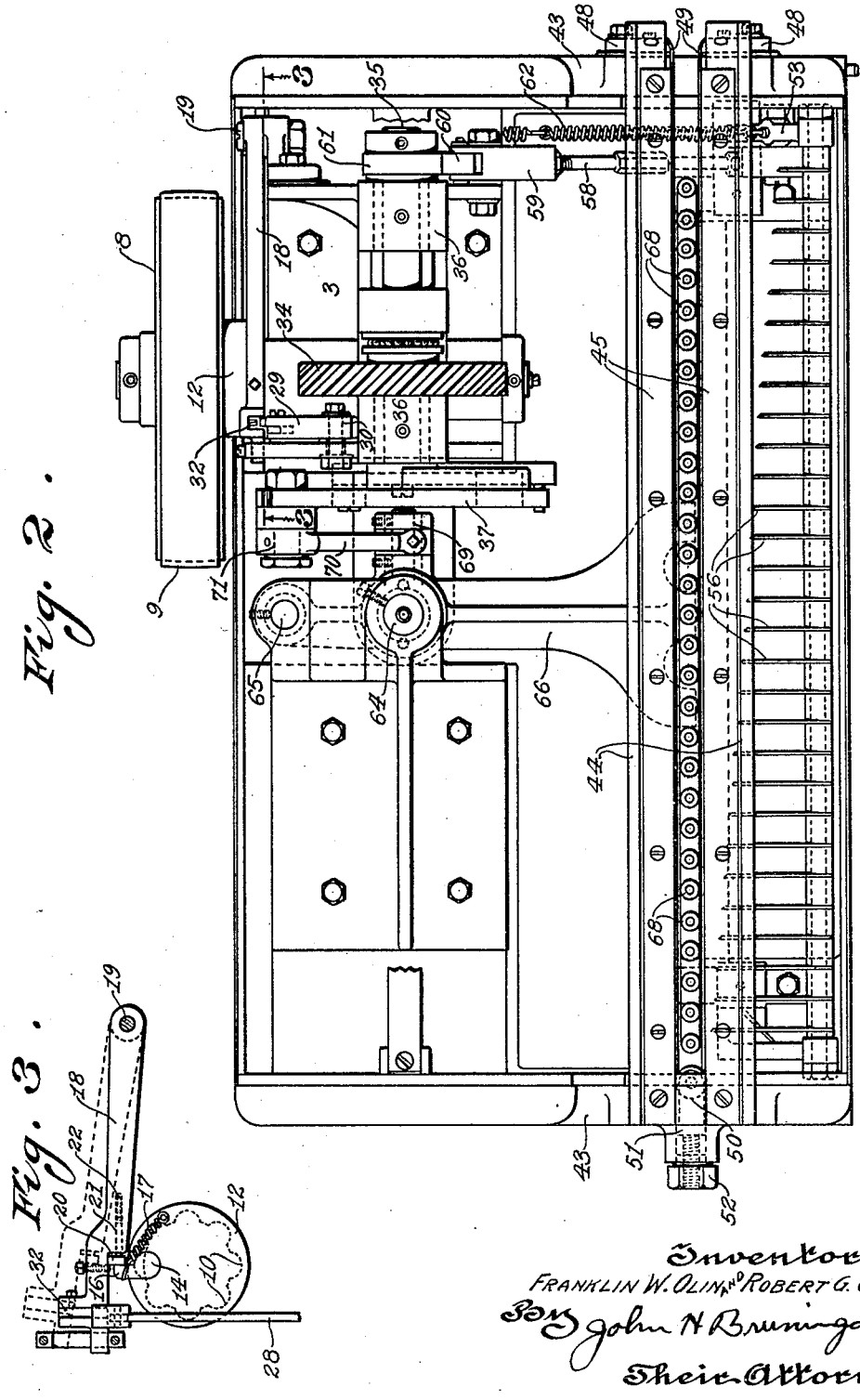

Patented Aug. 30, 1932

1,875,120

UNITED STATES PATENT OFFICE

FRANKLIN W. OLIN, OF ALTON, ILLINOIS, AND ROBERT G. CLYNE, OF ST. LOUIS, MISSOURI, ASSIGNORS TO WESTERN CARTRIDGE COMPANY, OF EAST ALTON, ILLINOIS, A CORPORATION OF DELAWARE

METHOD AND APPARATUS FOR INSPECTING CARTRIDGE SHELLS

Application filed March 9, 1928. Serial No. 260,441.

This invention pertains to inspection, and more particularly to a method and apparatus for inspecting cartridge shells during the manufacture of cartridges.

One of the objects of this invention is to provide a method and means by which the inspection of cartridge shells and the like may be simplified and the time required therefor reduced.

Another object is to provide a method and means for inspecting shells, by which the handling of the shells will be reduced to a minimum.

Another object is to provide a method and means whereby the shells may be inspected in groups, so as to reduce the time consumed.

Another object is to provide a method and means for handling the shells in groups so as to reduce the amount of manual manipulation required of the inspector.

Another object is to provide a method and means whereby the shells may be displayed before the inspector in such a way as to render the detection of defects easier and more certain.

Further objects will appear from the following description, taken in connection with the accompanying drawings, in which—

Figure 1 is an end view, partly in section, showing an inspecting machine embodying this invention;

Figure 2 is a plan view of the same;

Figure 3 is a detail, taken on line 3—3 of Figure 2;

Figure 4 is an enlarged view, similar to Figure 1, shown only for the better illustration of the operation of the machine; and Figure 5 is a side view of the shell clip.

Referring to the drawings, 1 designates a stand of any suitable design, upon which the device may be mounted at a convenient height. A base 2 is mounted on the stand 1 and carries a bracket 3. Journaled in bearings 4 in the bracket 3 is a shaft 5. Loosely mounted for rotation on the shaft 5 is a clutch member 6, which has mounted thereon and secured thereto, by means of a key 7, so as to rotate therewith, a pulley 8 adapted to be driven by a belt 9 from any suitable source of power, not shown. The front face of the clutch member 6 is provided with a recess formed with a series of semicircular sockets 10 about its inner rim, as shown in Figure 3. This socket is adapted to receive a projection 11 on the rear end of a second clutch member 12, secured by a key 13 to the shaft 5. The clutch member 12 has journaled therein a locking dog 14, which has its rear end cut away as shown at 15 (Figure 1). The dog 14 is adapted to project into one of the sockets 10 in the clutch member 6 so as to lock the two clutch members together. When, however, this dog is turned so that its cut away portion registers with the sockets 10, the clutch will be disengaged and the member 6 may rotate without carrying with it the member 12.

The forward end of the dog 14 is provided with an ear 16 tensioned by a spring 17, which tends to turn the dog into locking position with its solid portion engaged in one of the sockets 10. A stop bar 18, pivoted at 19 on the bracket 3, carries a stop 20 having a shank 21 seated in a socket in the bar 18 and resting upon a bumper spring 22 in the recess. The stop bar 18, when in the position shown in Figure 3, engages the ear 10 so as to hold the dog 14 in a position to disengage the clutch. When the bar 18 is lifted to the dotted line position of Figure 3, the stop 20 is disengaged from the ear 10, thereby permitting the spring 17 to rotate the dog into locking position so as to engage the clutch. When, as the clutch rotates, the bar 18 is returned to its full line position, the ear 10 will engage the stop 20 to be yieldingly arrested thereby. This rotates the dog 14 so as to disengage the clutch and at the same time arrests the clutch member 12.

A treadle 23 has an adjustable foot-piece 24 adapted to rest on the floor and is connected by a link 25 to a lever 26 pivoted at 27 on the stand 1. The other end of the lever 26 is connected by a link 28 with a lever 29 pivoted at 30 on the bracket 3. The lever 29 has a pointed tip adapted to engage the lower end of a spring catch 31 seated in a recess 32 in the stop bar 18 (see Figures 3 and 4). Depressing the treadle 23 will rock the lever 26 so as to raise the link 28 and the lever 29, which at this time is caught under the catch 31. This raises the stop bar 18 so as to release the ear 16 from the stop 20. Releasing the ear 16 will permit the dog 14 to effect engagement of the clutch and, as the member 6 runs continuously while the pulley 8 is being driven, the member 12 will be carried in rotation along with the member 6. As the upward movement of the lever 29 continues, it eventually passes out from beneath the catch 31, and the stop bar 18 is thereby released so as to drop back to its full line position (Figure 3). In this position the stop will arrest the ear 16 after one revolution of the clutch member and release the clutch. It will be seen, therefore, that a single depression of the treadle 23 will cause only one revolution of the clutch member 12, regardless of whether the operator retains the treadle 23 in depressed position or not. When the treadle is released, the link 28 and the lever 29 are returned by gravity to the full line position, Figure 4, the catch 31 permitting movement of the tip of the lever 29 past the stop bar, as indicated in dotted lines of Figure 4.

Rotation of the clutch member 12 carries with it the shaft 5, which is keyed thereto. This shaft also carries a spiral gear 33 meshing with a corresponding gear 34 suitably keyed to a shaft 35 carried in bearings 36 on the bracket 3. The gears 33 and 34 have a two to one ratio, so that one revolution of the gear 33 will cause a half revolution of the gear 34. The shaft 35 carries at one end a disc 37 provided with diametrically opposite notches 38 engaged by a roller 39 on the end of a locking lever 40 pivoted at 41 on the bracket 3 and tensioned by a spring 42. This locking lever serves to lock the shaft 35 accurately in position at the end of each half revolution.

Mounted at the ends of the base 2 are end frames 43. Mounted on the end frames 43 and so as to span the front of the machine is a pair of bars 44, to which are secured flat strips or rails 45. The rails 45 are spaced apart the proper distance so as to receive between them the body of a cartridge shell 46, but so that the rim of the shell base will not pass therethrough, but the shell will be supported on the rails by its rim, as shown in Figure 4. The rails 45 are preferably hinged, as indicated at 47, to the bars 44 so that they may be raised for the adjustment of the machine or in case of accident, as will presently be more fully described.

Mounted on one of the end frames 43 is a pair of blocks 48, to which are secured the ends of a wire 49. This wire passes to the other end of the machine and over a pulley 50 mounted in a block 51 adapted to slide in the end frame 43 and to be tensioned by a nut 52. This device serves to tension the wires 49, which are placed so as to engage the lower portion of the bodies 46 of the shells so as to guide them in their passage along the rails 45 and to maintain them in upright position. The rails 45 thus provide ways upon which the shells may be slid into place in the machine.

As the shells, as they enter the ways, are in close contact with one another, they must be spaced apart in order to accommodate further operation of the machine. In order to accomplish this purpose, a pair of arms 53 are secured to a shaft 54 suitably journaled on the base 2. The upper ends of these arms are joined by a bar 55, which carries a series of fingers 56 spaced at regular intervals therealong. These fingers have an arcuate shape, as shown in Figure 4, and are of progressively varying length, so that their tips are positioned in progressively receding order from one end of the machine to the other, as shown in the drawings. Pivoted at 57 to one of the arms 53 is an adjustable link 58, whose other end is guided by a pin and slot connection 59 on the bracket 3. The upper end of the link 58 carries a cam roller 60 engaging a cam 61 on the shaft 35. The arm 53 is tensioned by a spring 62, which keeps the roller 60 in engagement with the cam 61. This cam is provided with a recessed portion 63, which, as the cam rotates, permits the link to move upwardly and the arms 53 to swing to the right, Figure 4, under the influence of the spring 62. During this movement, the fingers 56 engage the shells 46 in succession, from left to right of the machine, as seen in Figure 2. Each finger as it engages its shell, moves all those shells to the right of it a slight distance to the right. As the fingers successively engage their shells, each shell is confined between a pair of fingers and is thereby positioned on the ways so that the shells are uniformly spaced therealong.

Mounted to slide vertically on a pair of columns 64 and 65, upstanding from the base 2, is a bracket 66. This bracket extends forwardly from the columns and carries at its forward end a cross-bar 67 extending to nearly the full length of the machine and carrying in uniformly spaced relation thereon a series of pins or holders 68 whose ends are tapered as shown. These holders are positioned so that each is below a shell as spaced on the ways by the fingers 56. Pivoted to the bracket 66 at 69 is a link 70, whose other end is pivoted at 71 to the disc 37. In the position shown in Figure 4, the bracket 66 and its holders 68 are depressed so as to be clear of the shells. When the disc 37 makes a half revolution, as previously described, the link 70 will carry the bracket 66 upwardly on the columns 64 and 65, to the position shown in dotted lines in Figure 4. During this movement, the holders 68 enter the shells 46 and raise them from the ways to a position above the ways, as shown in dotted lines in Figure 4. The holders are arranged to fit loosely within the shells. Their tips are rounded so as to provide pivots upon which the shells may rotate. In the elevated position shown in Figure 4, the shells are positioned before the eyes of the inspector in such a way that examination is rendered easy and simple. By passing the hand along the row of shells, each is rotated on its holder so that all sides thereof are brought into view. In order to further facilitate the inspection of all sides of the shells, a mirror 72 is adjustably mounted upon the cover 73 of the machine. This cover is mounted on the end frames 43 so as to cover and protect the machine and also protect the operator against accidental contact with the moving parts. The mirror 72 being placed behind the shells, the operator may see both sides of the shell at the same time.

It will be noted that the recessed portion 63 of the cam 61 extends over only about one quarter of the circumference of the cam. Accordingly, it will be clear that, when the shells have been properly spaced, the fingers 56 are again withdrawn before the holders 68 rise to a sufficient height to lift the shells from the ways.

The device is operated as follows:

The pulley 8 is driven continuously from a suitable source of power during the operation of the machine. A group of shells is received preferably by means of a suitable chute, not shown, from a source of supply and delivered to the right-hand end of the machine, Figure 2, so as to slide upon the rails 45. A suitable number of shells having been deposited upon the ways, the operator depresses the treadle 23. This operates, as described, to lift the stop bar 18, permitting the clutch to engage so as to carry the shaft 5 in rotation with the pulley. One rotation of this shaft, operating through the gears 33 and 34, effects a half rotation of the shaft 35. At the completion of one revolution of the shaft 5, the stop 20 again arrests the ear 16 so as to disengage the clutch and prevent the shaft 5 from making more than one revolution. During the first part of the half revolution of the shaft 35, the fingers 56 are swung rearwardly through the operation of the cam 61, so as to separate and space the shells uniformly along the ways. The fingers are again retracted and thereafter the holders 68 raise the shells above the ways to the dotted line position of Figure 4. At the end of this half revolution, the device is locked in position by the lever 40. The inspector now examines the exterior of the shells either directly or in the mirror 72, or both. Upon completion of the examination of the exterior, a clip bar 74, provided with a pair of clips 75 for each shell, is placed upon the group of shells, so that the clips 75 will grasp the rim of each shell base. By lifting the bar 74, the group of shells is then removed from the machine. The bar is now inverted so as to bring the open ends of the shells to the top, and the interiors of these shells are now examined. The shells are all held in upright position, so that the interior may be rapidly inspected by passing the glance quickly from one to another. In this position also, the light may be directed to the interior so that defects are easily detected. Upon completion of the interior inspection, the operator may deposit the entire group in a suitable receptacle by a simple side pressure on the shells, so as to disengage their bases from the clips.

In the meantime the operator has again depressed the treadle 23 so as to cause a second half revolution of the disc 37. This operation simply permits the links 70 to lower the brackets 66 and the holders 68, and the device is again locked by the lever 40. In this position, the machine is ready to receive a new batch of shells, and the operation is repeated.

It will be seen that this invention provides a novel and effective method of inspecting cartridge shells. The shells are handled in groups. A group is received on the ways, the shells are separated, and the entire group is then lifted above the ways to a position convenient for careful inspection. The exteriors are inspected, rotating the shells, if necessary, and examined then with the aid of the mirror 72. The exteriors having been inspected, the shells are removed in a group quickly and by a simple operation, by means of the clip bar 74, and inverted so that the interiors may be rapidly and effectively examined.

The device of this invention is simple and effective and provides means for inspecting shells very rapidly. The device handles the shells in groups. One operation of the treadle is accompanied by one step in the operation of the machine. It is immaterial whether the operator releases the treadle or holds it down, so that the position of the treadle has nothing to do with the accurate operation of the machine. The shells are separated and then picked up by the holders and lifted to a proper position for inspection. The spacing of the shells is carried out progressively, since the fingers 56 engage the shells in succession. It will be clear, therefore, that each shell must be moved only a certain small distance by its finger, and there is no possibility of the fingers jamming against the shells on account of too great a displacement of the shell from its proper place. The ways 45 are hinged so that, as suggested above, in case of accident, such as the operator operating the treadle while the fingers are between the ways, there is no possibility of jamming, since the ways will hinge upwardly so as to release the hand. The guide wires 49 support the shells against the pressure of the fingers 56 so that tipping and possible disengagement of the shells from the ways during the spacing operation are avoided.

While the machine has been described as a unitary construction, it will be understood that sub-combinations are of utility, and such use is contemplated by this invention. It is further obvious that various changes may be made, within the scope of the appended claims, in the details of construction without departing from the spirit of this invention. It is, therefore, to be understood that this invention is not limited to the specific details shown and described.

Having thus described the invention, what is claimed is:

1. An inspection device for cartridge shells, comprising, ways adapted to receive a group of shells, a series of fingers adapted to space the shells on said ways, and a holder having elements adapted to enter the spaced shells and movable to shift the shells from said ways.

2. An inspection device for cartridge shells, comprising, ways adapted to receive a group of shells, a series of fingers adapted for movement to space the shells on said ways, a holder having elements adapted to enter the spaced shells and movable to shift the shells from said ways, and means for moving said fingers and said holder in timed relation.

3. An inspection device for cartridge shells, comprising, ways adapted to receive a group of shells, a series of fingers adapted for movement to space the shells on said ways, a holder having elements adapted to enter the spaced shells and movable to shift the shells from said ways, a manipulative element, and operating means controlled by said manipulative element adapted upon alternate manipulations thereof to operate said fingers and thereafter shift said holder and to return said holder.

4. An inspection device for cartridge shells, comprising, ways adapted to receive a group of shells, a series of fingers adapted for movement to space the shells on said ways, a holder having elements adapted to enter the spaced shells and movable to shift the shells from said ways, a manipulative element, and operating means controlled by said manipulative element adapted upon manipulation thereof to cause said fingers to pass between the shells on said ways to space the same and thereafter to shift said holder to elevate the shells relative said ways.

5. An inspection device for cartridge shells, comprising, ways adapted to receive a group of shells, a series of fingers movable to engage the shells and having their tips positioned in progressively receding order, and means for moving said fingers so as to engage the shells in succession in order to space the same on said ways.

6. An inspection device for cartridge shells, comprising, ways adapted to receive a group of shells, and a series of fingers adapted to engage the shells on said ways to space the same, said ways being hinged for movement to prevent jamming of the shells by said fingers.

7. An inspection device for cartridge shells, comprising, ways adapted to receive a group of shells, a series of fingers adapted for movement to space the shells on said ways, a holder having elements adapted to enter the spaced shells and movable to shift the shells from said ways, a manipulative element, and operating means controlled by said manipulative element adapted to move said fingers and said holder through a cycle of operations and to stop positively at the end of the cycle regardless of the position of said element.

8. An inspection device for cartridge shells, comprising, ways adapted to receive a group of shells, a series of fingers adapted for movement to space the shells on said ways, a holder having elements adapted to enter the spaced shells and movable to shift the shells from said ways, a manipulative element, and operating means controlled by said manipulative element adapted to move said fingers and said holder through different cycles of operation and to stop positively at the end of each cycle regardless of the position of said element.

9. An apparatus for inspecting cartridge shells, comprising, means for receiving a group of shells, means for shifting the group of shells relative said receiving means to a position with their bases exposed, and a clip bar adapted to grasp and hold the base flanges of the shells of the group whereby the group may be removed from said shifting means.

10. The method of inspecting cartridge shells, comprising, arranging the shells of a group in a row, thereafter spacing the shells in the row successively therealong, and elevating the spaced shells for examination.

11. The method of inspecting cartridge shells, comprising, arranging the shells of a group in a row, thereafter spacing the shells in the row successively therealong, engaging a group of the spaced shells interiorly, and shifting the shells so engaged for examination.

In testimony whereof I affix my signature this 16th day of November, 1927.

FRANKLIN W. OLIN.

In testimony whereof I affix my signature this 16th day of November, 1927.

ROBERT G. CLYNE.